United States Patent
Suresh

(10) Patent No.: US 10,693,860 B2
(45) Date of Patent: Jun. 23, 2020

(54) RDP PROXY SUPPORT IN PRESENCE OF RDP SERVER FARM WITH SESSION DIRECTORY OR BROKER

(71) Applicant: Citrix Systems, Inc., Fort Lauderdale, FL (US)

(72) Inventor: Viswanath Yarangatta Suresh, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 259 days.

(21) Appl. No.: 15/699,892

(22) Filed: Sep. 8, 2017

(65) Prior Publication Data

US 2019/0081942 A1  Mar. 14, 2019

(51) Int. Cl.
G06F 21/41 (2013.01)
H04L 29/06 (2006.01)
G06F 9/451 (2018.01)
H04L 29/08 (2006.01)

(52) U.S. Cl.
CPC .......... *H04L 63/0815* (2013.01); *G06F 9/452* (2018.02); *G06F 21/41* (2013.01); *H04L 63/083* (2013.01); *H04L 67/1002* (2013.01); *H04L 67/1004* (2013.01); *H04L 67/42* (2013.01)

(58) Field of Classification Search
CPC ..... G06F 9/452; G06F 21/41; H04L 63/0815; H04L 63/083; H04L 67/1002; H04L 67/1004; H04L 67/42
USPC .......................................................... 726/7
See application file for complete search history.

(56) References Cited

U.S. PATENT DOCUMENTS

| | | | |
|---|---|---|---|
| 9,538,345 B2* | 1/2017 | Sah | H04W 4/14 |
| 9,712,463 B1* | 7/2017 | Hughes | H04L 67/1097 |
| 2003/0191843 A1* | 10/2003 | Balissat | H04L 63/0281 709/227 |
| 2009/0241176 A1* | 9/2009 | Beletski | G06F 9/505 726/7 |
| 2010/0131654 A1* | 5/2010 | Malakapalli | H04L 67/08 709/227 |
| 2011/0153716 A1* | 6/2011 | Malakapalli | G06F 9/45533 709/203 |

(Continued)

OTHER PUBLICATIONS

International Search Report and Written Opinion in International Appl. No. PCT/US2018/049485, dated Nov. 16, 2018.

*Primary Examiner* — Farid Homayounmehr
*Assistant Examiner* — Thanh T Le
(74) *Attorney, Agent, or Firm* — Foley & Lardner LLP

(57) ABSTRACT

Described embodiments provide systems and methods for connecting to a server of a plurality of servers. The system may include a device intermediary between a client and a plurality of servers. The device may receive a remote desktop protocol (RDP) request from the client to connect to one of the plurality of servers. The RDP request may include a token. The device may cause a load-balancer of the plurality of servers to modify or remove the token of the RDP request, responsive to presence of a session directory/broker. The device may receive a server redirect packet that indicates a target server identified from the plurality of servers by the session directory, to which the client is to connect. The device may cause the server redirect packet to be modified to cause the client to send a redirected connection request packet for connecting with the target server.

18 Claims, 10 Drawing Sheets

(56) References Cited

U.S. PATENT DOCUMENTS

| | | | |
|---|---|---|---|
| 2011/0153838 A1* | 6/2011 | Belkine | G06F 9/505 |
| | | | 709/227 |
| 2011/0153853 A1* | 6/2011 | London | G06F 9/455 |
| | | | 709/229 |
| 2011/0154443 A1 | 6/2011 | Thakur et al. | |
| 2013/0074179 A1 | 3/2013 | Das et al. | |
| 2013/0227058 A1* | 8/2013 | Drysdale | H04L 47/70 |
| | | | 709/217 |
| 2014/0149794 A1* | 5/2014 | Shetty | H04L 67/1095 |
| | | | 714/20 |
| 2016/0234343 A1* | 8/2016 | Fausak | H04L 12/4679 |
| 2017/0310659 A1* | 10/2017 | Pranam | H04L 63/0815 |
| 2018/0115601 A1* | 4/2018 | Qiu | H04L 47/125 |

\* cited by examiner

RDP PROXY SUPPORT IN PRESENCE OF RDP SERVER FARM WITH SESSION DIRECTORY OR BROKER

FIELD OF THE DISCLOSURE

This disclosure generally relates to system and methods for provisioning server resources, including but not limited to provisioning a remote desktop session

BACKGROUND

The Remote Desktop Protocol (RDP) may provide a client access to a resource with a graphical user interface hosted on a server via a network. An RDP agent executing on the client may perform authentication with the server to establish a connection for a remote desktop session. In accordance to the protocol, separate virtual channels may be used to carry rendering information and input/output data between the client and the server. Once the connection is established, the server may send rendering information for the hosted resource in packets to the client. Upon receipt of the packets, the RDP agent of the client may interpret the rendering information and present the resource for display.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed toward systems and methods of connecting to a server of a plurality of servers. A client may initiate a remote desktop session in accordance with the Remote Desktop Protocol (RDP) for a resource hosted at a server, upon detecting a request to execute a RDP file downloaded from a RDP proxy via a link. The link may be published or dynamically generated. To establish the remote desktop session, a connection request with a unique security token may be sent from the client and may land on the RDP proxy. Based on the security token, the RDP proxy may select the appropriate server and may perform authentication (e.g., a single sign-on (SSO)) with the server based on a configuration to complete establishment of the session. The server may be part of a server farm with a session directory (or a session broker). In such an environment, the token used by the session broker may differ from a token set or provided by the RDP proxy. Consequently, the connection request and subsequent data packets may be improperly processed and/or routed (e.g., to another server instead of the intended/appropriate RDP server).

To support clients connecting to a server farm with a session broker through a single point of entry and to maintain persistency for a given remote desktop session, the RDP proxy may perform load balancing among the servers to handle reallocation by the server broker. To that end, the RDP proxy may connect with a load balancer or may perform at least some of the functionalities of the load balancer. The load balancer may act as a back end server to the RDP module, and may allocate connections across the servers of the server farm. As data packets move between the server farm and the client, the load balancer (for instance) may modify and/or remove a token from the data packets. The load balancer may then forward the data packets to the server such that connection may be established without any error.

If the packet is for an already existing session for the client assigned to a different server, the session directory may instruct or inform the server that initially received the packet to redirect the connection to the other server. The initial server may send a server redirect packet back to the RDP proxy via the load balancer. The server redirect packet may have target server data, load balancing information, and/or account credentials for the client.

Upon receipt of the server redirect packet, the RDP proxy may modify the server redirect packet such that a subsequent redirected connection request from the client includes a security token to route the packet to the target server and/or to perform authentication. To this end, the RDP proxy may update, modify, and/or remove one or more fields of the server redirect packet, such as the target server data, the load balancing information, and/or the account credentials. In connections where single sign-in (SSO) is not used, the server redirect packet may be updated such that the resultant redirected connection request packet from the client may be used to connect to the backend target server with the account credentials automatically passed through the RDP stream between the client and the server. The RDP proxy may then send the modified server redirect packet to the client, and may subsequently receive the redirected connection request from the client. On receiving the request, the security token may be fetched by the RDP proxy to connect to the backend target server along with authentication and/or enforcement information based on configuration.

In this manner, data packets for the session between the client and the server may be routed to the backend target server assigned/determined by the session directory for the connection. Furthermore, the RDP proxy may support remote desktop session with or without single sign-on (SSO) at the proxy for connections launched through links for resources provided to the client, in the presence of the session directory at the server farm. Remote desktop sessions may be also be compatible in the presence of multiple clients and the server farm through a single link for all the clients connecting to the server farm with or without single sign-on.

In one aspect, the present disclosure is directed to embodiments of a system for connecting to a server of a plurality of servers. The system may include a device intermediary between at least one client and a plurality of servers. The device may receive a remote desktop protocol (RDP) request from a first client of the at least one client to connect to one of the plurality of servers. The RDP request may include a token. The device may cause a load-balancer of the plurality of servers to modify or remove the token of the RDP request, responsive to presence of a session directory. The device may receive a server redirect packet that indicates a target server identified from the plurality of servers by the session directory, to which the first client is to connect. The device may cause the server redirect packet to be modified to cause the first client to send a redirected connection request packet for connecting with the target server.

In some embodiments, the device may cause the server redirect packet to be modified to cause the first client to send a redirected connection request packet. The redirected connection request packet may include a token. The token may provide at least one of: an indication of the target server, or configuration information for the intermediary to perform single sign-on (SSO) with the target server, or configuration information for the intermediary to control access to one or more resources.

In some embodiments, the device may cause the server redirect packet to be modified to cause the first client to provide at least one of: authentication credentials in a RDP communication stream to the target server responsive to unavailability of single sign-on (SSO), or configuration information to control access to one or more resources. In some embodiments, the device may cause at least one of: information about the target server, authentication credentials, or information for load-balancing, of the server redirect packet to be modified.

In some embodiments, the system may further include the load-balancer. The load-balancer may reside on the device or be separate from the device. In some embodiments, the device may receive the RDP request. The RDP request may be initiated via a link that is published or dynamically created. In some embodiments, the device may receive a second RDP request from a second client to connect to a server of the plurality of servers. The second RDP request may be initiated via the link.

In some embodiments, the device may send the modified server redirect packet to the first client. In some embodiments, the device may receive the server redirect packet. The server redirect packet may be generated by a first server of the plurality of servers that is initially selected by the load-balancer responsive to the RDP request. In some embodiments, the device may cause the load-balancer to modify or remove the token of the RDP request to enable a connection to the first server to be established.

In another aspect, the disclosure is directed to a method of connecting to a server of a plurality of servers. An intermediary between at least one client and a plurality of servers may receive a remote desktop protocol (RDP) request from a first client of the at least one client to connect to one of the plurality of servers. The RDP request may include a token. A load-balancer of the plurality of servers may be caused to modify or remove the token of the RDP request, responsive to presence of a session directory. The intermediary may receive a server redirect packet that indicates a target server identified from the plurality of servers by the session directory, to which the first client is to connect. The server redirect packet may be modified to cause the first client to send a redirected connection request packet for connecting with the target server.

In some embodiments, modifying the server redirect packet may include modifying the server redirect packet to cause the first client to send a redirected connection request packet. The redirected connection request packet may include a token. The token may provide at least one of: an indication of the target server, configuration information for the intermediary to perform single sign-on (SSO) with the target server, or configuration information for the intermediary to control access to one or more resources.

In some embodiments, modifying the server redirect packet may include modifying the server redirect packet to cause the first client to provide authentication credentials in a RDP communication stream to the target server, responsive to unavailability of single sign-on (SSO), or configuration information to control access to one or more resources.

In some embodiments, modifying the server redirect packet may include modifying at least one of: information about the target server, authentication credentials, or information for load-balancing. In some embodiments, modifying the server redirect packet may include having at least one of the intermediary or the load-balancer modify the server redirect packet.

In some embodiments, receiving the RDP request from the first client may include receiving the RDP request initiated via a link that is published or dynamically created. In some embodiments, a second RDP request may be received from a second client to connect to a server of the plurality of servers, the second RDP request initiated via the link.

In some embodiments, the intermediary may send the modified server redirect packet to the first client. In some embodiments, receiving the server redirect packet may include receiving a server redirect packet generated by a first server of the plurality of servers. The first server may be initially selected by the load-balancer responsive to the RDP request. In some embodiments, causing the load-balancer of the plurality of servers to modify or remove the token of the RDP request may include modifying or removing the token to enable a connection to the first server to be established.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for connecting to a server of a plurality of servers in presence of a session broker.

A. Network and Computing Environment

Figure 1A:
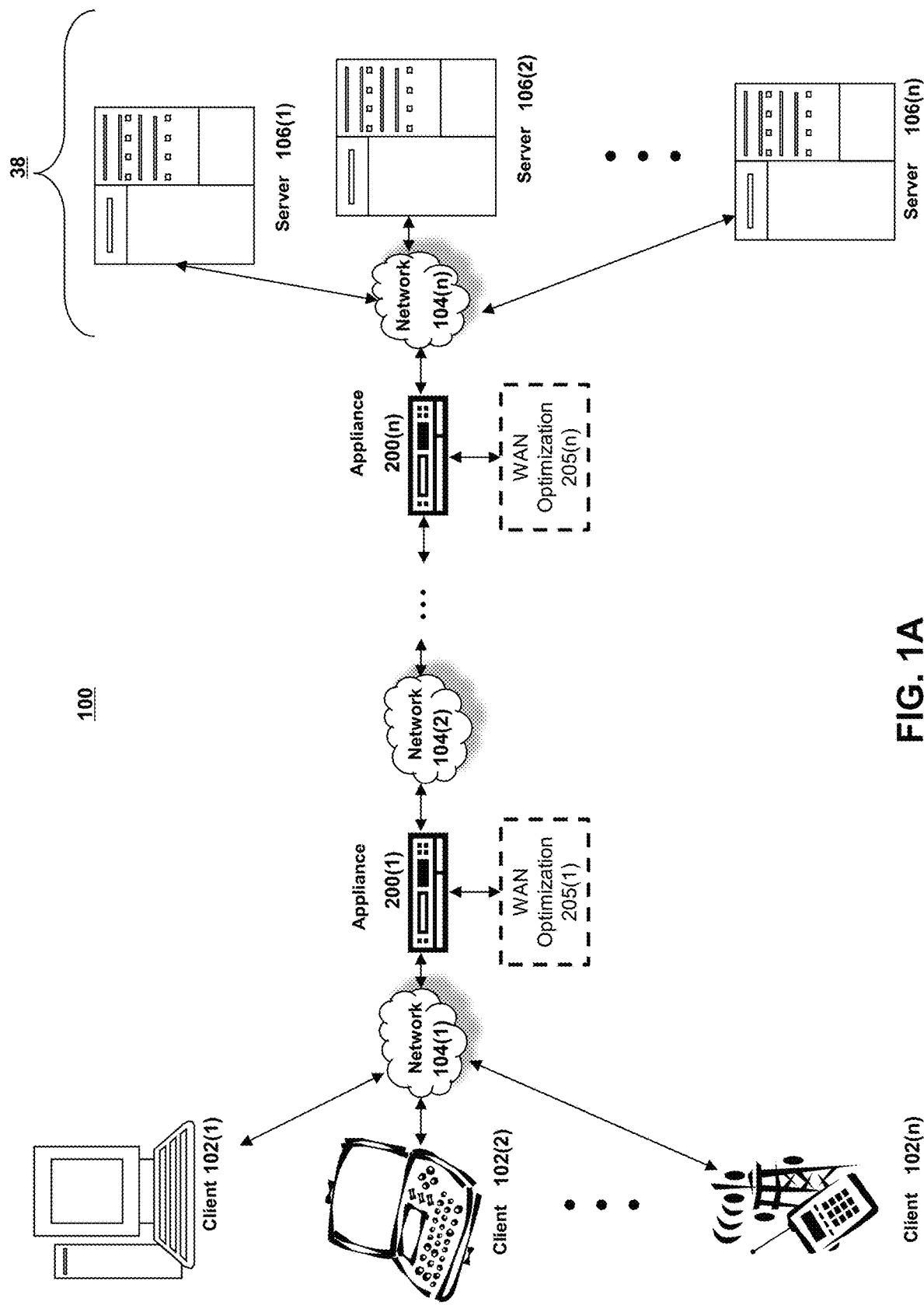
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
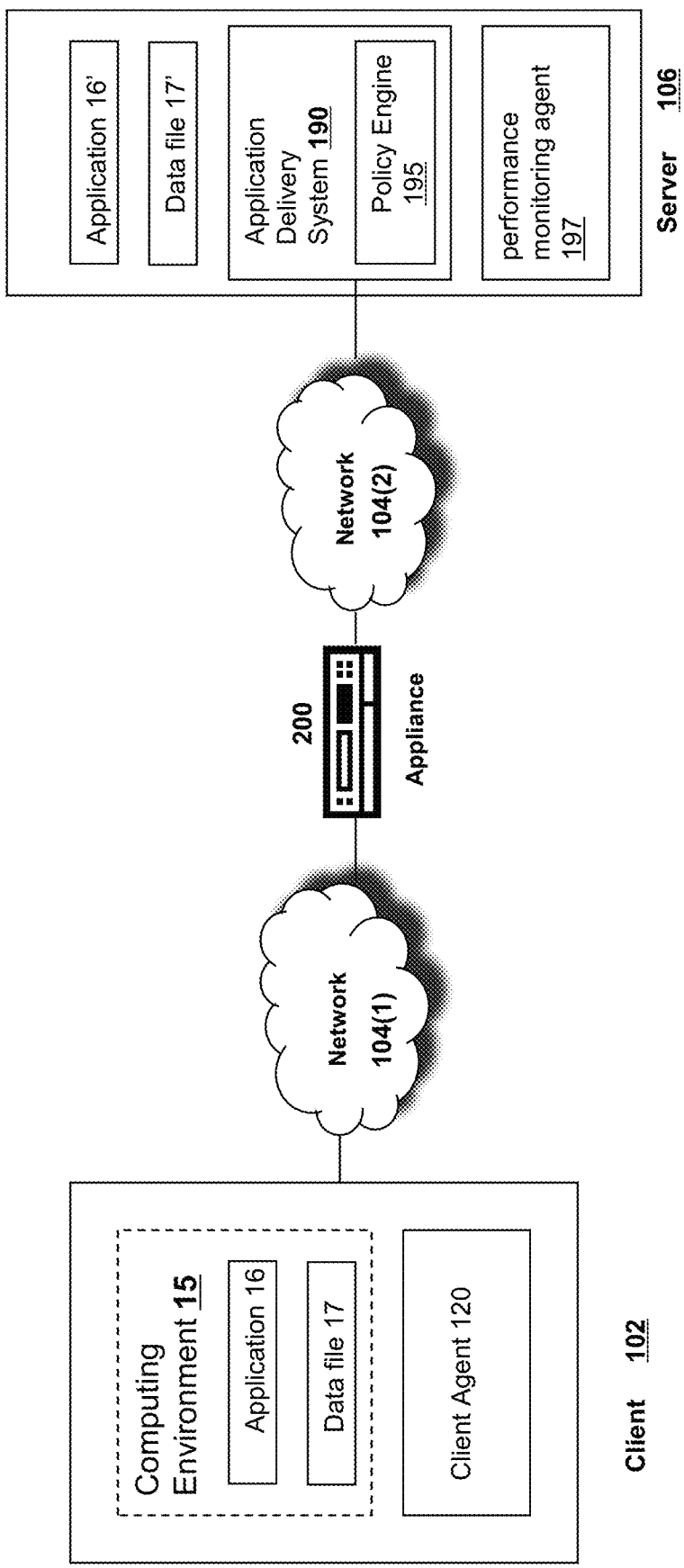
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
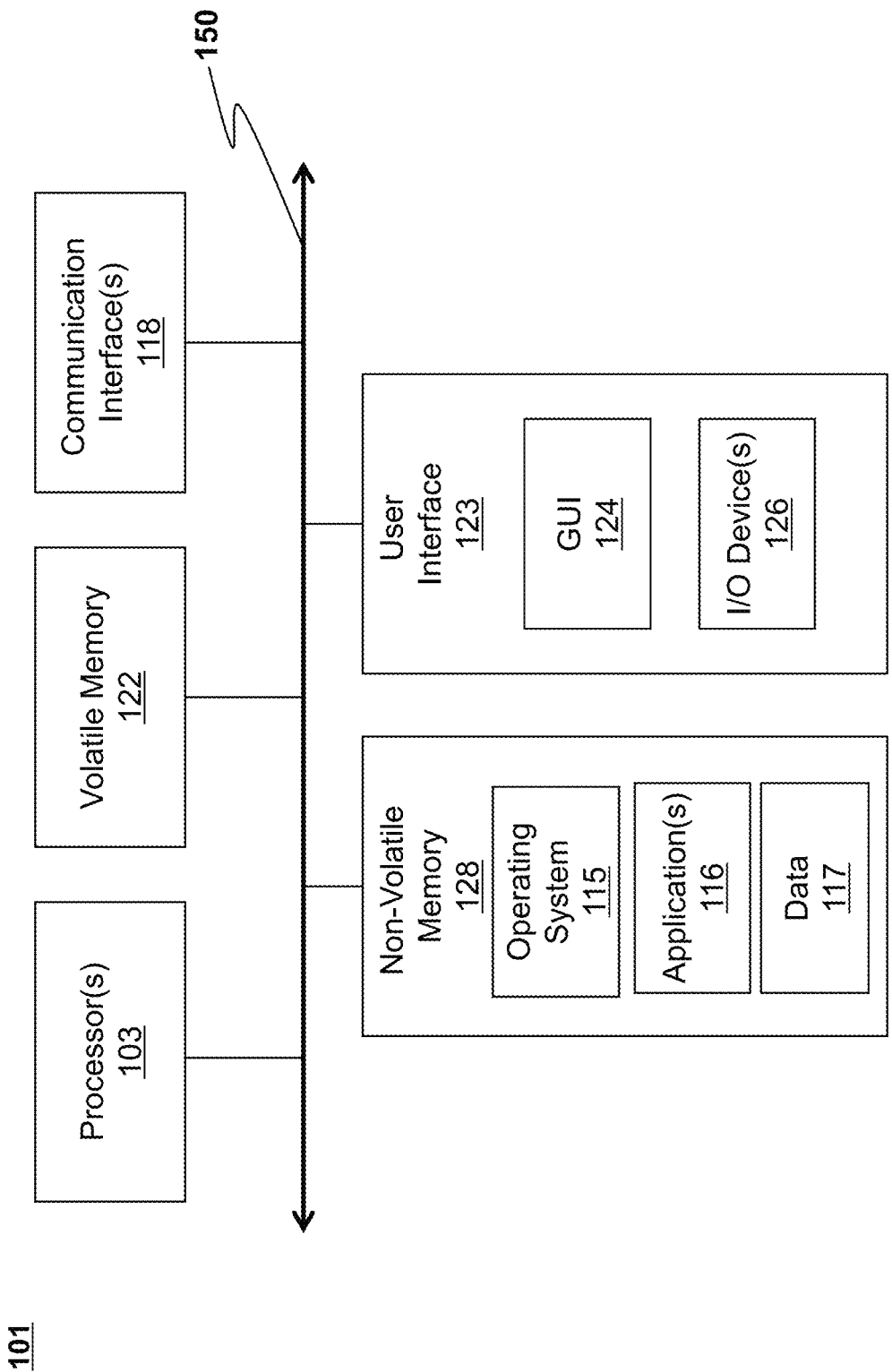
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla., the teachings of which are hereby incorporated herein by reference.

B. Appliance Architecture

Figure 2:
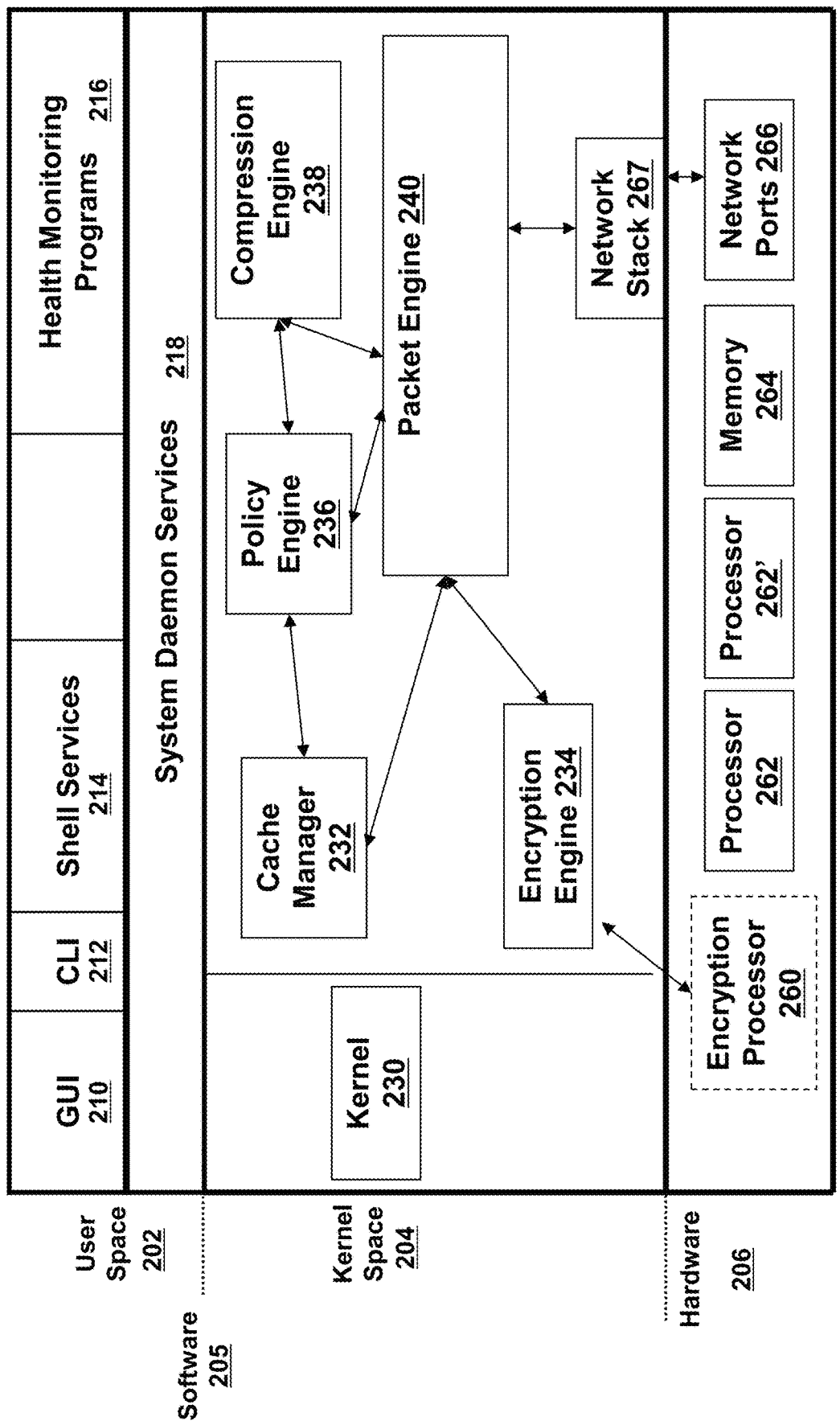
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla., the teachings of which are hereby incorporated herein by reference.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
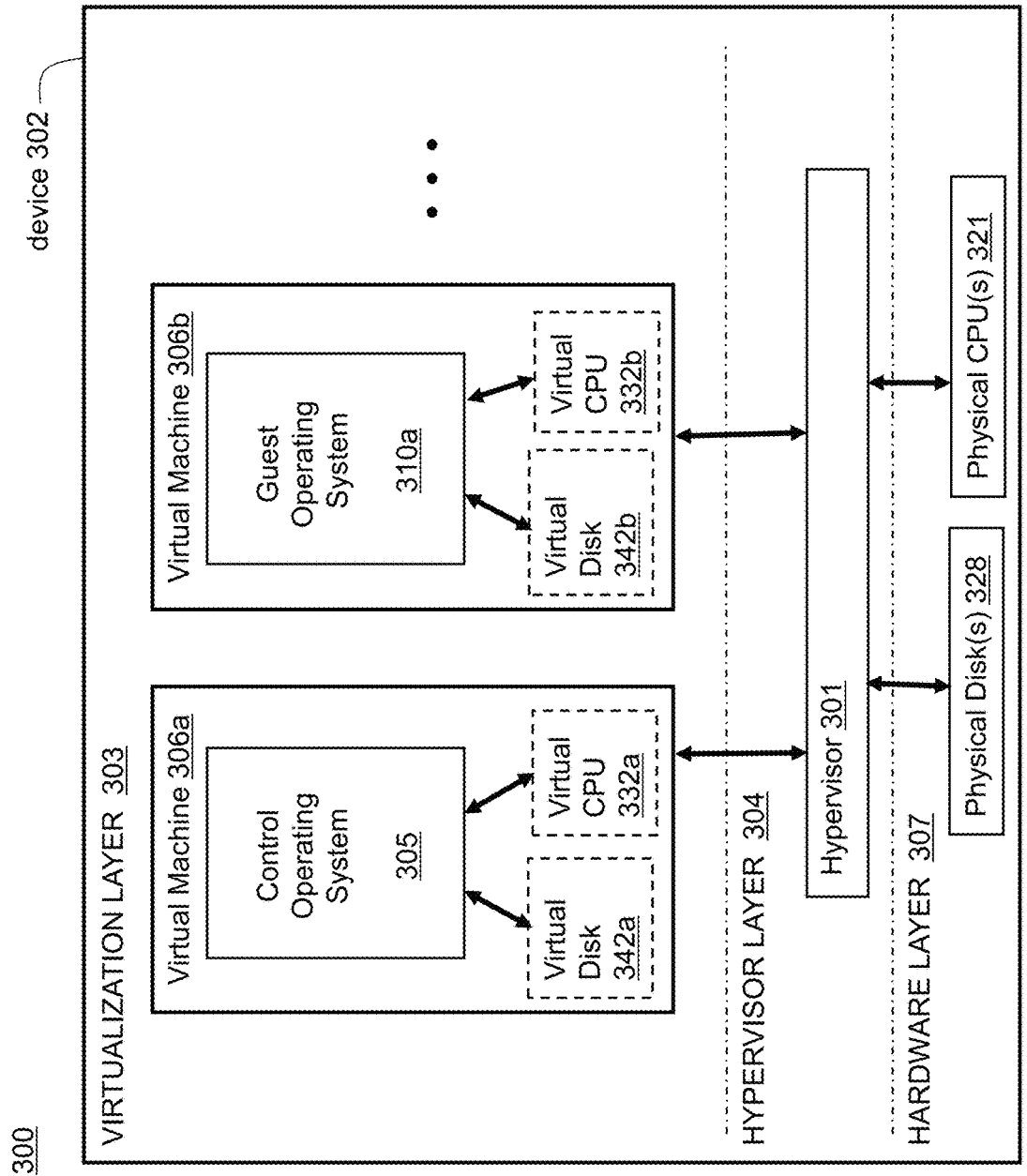
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla., the teachings of which are hereby incorporated herein by reference.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla., the teachings of which are hereby incorporated herein by reference.

D. Systems and Methods for Providing a Distributed Cluster Architecture

Figure 4:
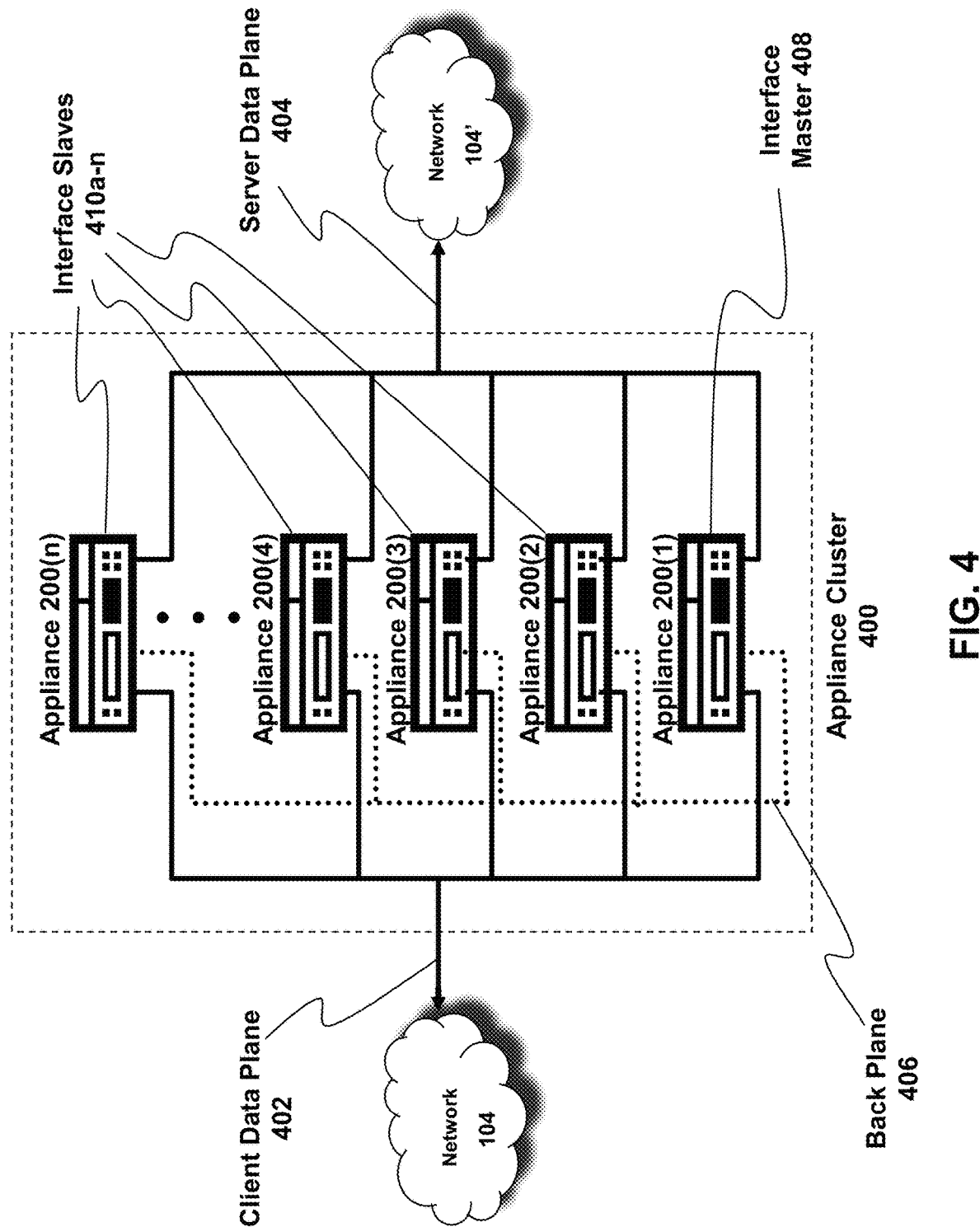
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla., the teachings of which are hereby incorporated herein by reference.

E. Systems and Methods for Connecting to a Server of a Plurality of Servers in Presence of a Session Broker The present disclosure is directed toward systems and methods of connecting to a server of a plurality of servers. A client may initiate a remote desktop session in accordance with the Remote Desktop Protocol (RDP) for a resource hosted at a server, upon detecting a request to execute a RDP file downloaded from a RDP proxy via a link. The link may be published or dynamically generated. To establish the remote desktop session, a connection request with a unique security token may be sent from the client and may land on the RDP proxy. Based on the security token, the RDP proxy may select the appropriate server and may perform authentication (e.g., a single sign-on (SSO)) with the server based on a configuration to complete establishment of the session. The server may be part of a server farm with a session directory (or a session broker). In such an environment, the token used by the session broker may differ from a token set or provided by the RDP proxy. Consequently, the connection request and subsequent data packets may be improperly processed and/or routed (e.g., to another server instead of the intended/appropriate RDP server).

To support clients connecting to a server farm with a session broker through a single point of entry and to maintain persistency for a given remote desktop session, the RDP proxy may perform load balancing among the servers to handle reallocation by the server broker. To that end, the RDP proxy may connect with a load balancer or may perform at least some of the functionalities of the load balancer. The load balancer may act as a back end server to the RDP module, and may allocate connections across the servers of the server farm. As data packets move between the server farm and the client, the load balancer (for instance) may modify and/or remove a token from the data packets. The load balancer may then forward the data packets to the server such that connection may be established without any error.

If the packet is for an already existing session for the client assigned to a different server, the session directory may instruct or inform the server that initially received the packet to redirect the connection to the other server. The initial server may send a server redirect packet back to the RDP proxy via the load balancer. The server redirect packet may have target server data, load balancing information, and/or account credentials for the client.

Upon receipt of the server redirect packet, the RDP proxy may modify the server redirect packet such that a subsequent redirected connection request from the client includes a security token to route the packet to the target server and/or to perform authentication. To this end, the RDP proxy may update, modify, and/or remove one or more fields of the server redirect packet, such as the target server data, the load balancing information, and/or the account credentials. In connections where single sign-in (SSO) is not used, the server redirect packet may be updated such that the resultant redirected connection request packet from the client may be used to connect to the backend target server with the account credentials automatically passed through the RDP stream between the client and the server. The RDP proxy may then send the modified server redirect packet to the client, and may subsequently receive the redirected connection request from the client. On receiving the request, the security token may be fetched by the RDP proxy to connect to the backend target server along with authentication and/or enforcement information based on configuration.

In this manner, data packets for the session between the client and the server may be routed to the backend target server assigned/determined by the session directory for the connection. Furthermore, the RDP proxy may support remote desktop session with or without single sign-on (SSO) at the proxy for connections launched through links for resources provided to the client, in the presence of the session directory at the server farm. Remote desktop sessions may be also be compatible in the presence of multiple clients and the server farm through a single link for all the clients connecting to the server farm with or without single sign-on and/or security enforcement, or through separate links (e.g., RDP proxy links) for different clients and/or different connections to the server, with or without single sign-on and/or security enforcement.

Figure 5A:
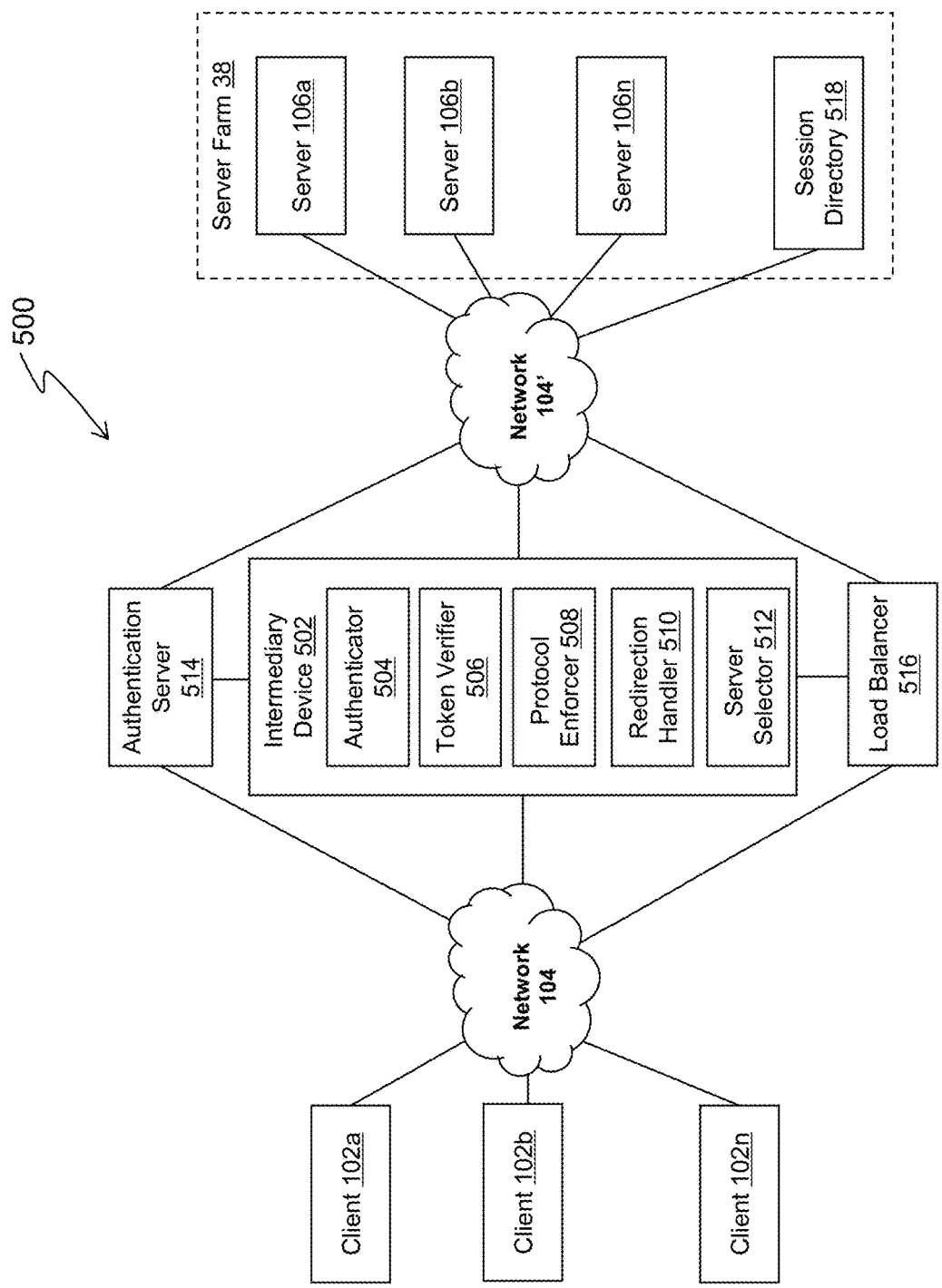
FIG. 5A is a block diagram of a system for connecting to a server of a plurality of servers in presence of a session broker, in accordance with an illustrative embodiment.

Referring now to FIG. 5A, an embodiment of a system 500 for connecting to a server of a plurality of servers in presence of a session broker is depicted. In brief overview, the system 500 may include one or more clients 102a-n, an intermediary device 502, an authentication server 514, a load balancer 516, and a server farm 38. The server farm 38 may include one or more servers 106a-n and a session directory 518. The intermediary device 502 may include a token verifier 506, a protocol verifier 508, a redirection handler 510, and a server selector 508. In some embodiments, the load balancer 516 may be a part of the intermediary device 502. The one or more clients 102a-n may be communicatively connected to the intermediary device 502, the authentication server 514, and/or the load balancer 516 via network 104. The intermediary device 502, the authentication server 514, and/or the load balancer 516 may be communicatively connected with the servers 106a-n and/or the session directory 518 of the server farm 38.

Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device 102. The hardware includes circuitry such as one or more processors, for example, as described above in connection with at least 1E and 1F, in one or more embodiments.

The systems and methods of the present solution may be implemented in any type and form of device, including clients, servers and appliances 200. As referenced herein, a "server" may sometimes refer to any device in a client-server relationship, e.g., an appliance in a handshake with a client device. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and clustered environments described herein. The intermediary device 502 can, for instance, include any embodiments of one or more features of the appliance 200 described above in connection with at least FIGS. 1A-1C, 2, and 4.

To establish an RDP stream for accessing a resource hosted on one of the servers 106a-n of the server farm 38, each client 102a-n may first send a request to authenticate to the authenticator 504 of the intermediary device 502. The request to authenticate may include account credentials of the client 102a-n. In some embodiments, the account credentials may include multiple authentication factors (e.g., username, password, and biometric information, etc.). Upon receipt of the request to authenticate, the authenticator 504 may perform authentication with the authentication server 514 using the account credentials from the client 102a-n. The authentication may be in accordance with Lightweight Directory Access Protocol (LDAP), Remote Authentication Dial-In User Service (RADIUS), Security Account Manager authentication (SAM), Web Authentication (WebAuth), and/or Open Authorization (OAuth), among others. Upon completion of the authentication, the authentication server 514 may transmit a success indicator or a failure indicator to the authenticator 504. The success indicator may indicate that the authentication for the token is successful. On the other hand, the failure indicator may indicate that the authentication for the token is not successful. If a failure indicator is received from the authentication server 514, the authenticator 504 may forward the failure indicator to the client 102a-n. In some embodiments, the client 102a-n may then re-attempt authentication by sending another request to repeat this process.

If a success indicator is received from the authentication server 514, the authenticator 504 may send a confirmation of authentication. The authenticator 504 may send one or more links identifying resources hosted on the servers 106a-n available to the client 102a-n. Each resource may be an application, desktop session and/or a webpage, among others. The link may include an address (e.g., Uniform Resource Locator). The address may reference the intermediary device 502 and the resource hosted on the server 106a-n. In some embodiments, the address of the link may reference the load balancer 516. In some embodiments, the authenticator 504 may identify a link published by the server 106a-n or the intermediary device 502 for the resource. In some embodiments, the address of the link may include one or more access parameters. The one or more access parameters may correspond to configuration information for the intermediary device 502 to control access to the resource. The one or more parameters may be generated by the authenticator 504 based on the user/account credentials in the request to authenticate the client and/or user. In some embodiments, the authenticator 504 may dynamically generate the link for the resource, e.g., based on availability of the resource, and/or responsive to a user logging on. In some embodiments, the one or more links may be on a homepage associated with the intermediary device 502 and/or the one or more servers 106a-n.

Having received the one or more links, the client 102a-n may establish or launch an RDP connection via the intermediary device 502 in accordance to the Remote Desktop Protocol (RDP), e.g., by selecting or activating one of the one or more links. On the client 102a-n, each link may be presented on a graphical user interface of an application executing thereon. In some embodiments, the link may be published by the server 106a-n and/or the intermediary device 502. Upon execution or invocation of the link, the client 102a-n may generate an RDP request using the link. The RDP request may be in conformance with X.224 Connection Request Protocol Data Unit (PDU). The RDP request may include a token (sometimes referred to as a routing token or cookie). The token may comprise a token or information in a routing token field of a RDP request or a X.224 Connection Request PDU. The token may be a byte sequence that may include a length, a length indicator, a type credit, a destination reference, a source reference (corresponding to the client 102a-n), and/or a cookie, among others. In some embodiments, the destination reference may correspond to the load balancer 516, to which the RDP request is to be routed. The cookie may include a reference address corresponding to the server 106a-n, to which the RDP request is to be routed by the intermediary device 502 and/or the load balancer 516. In some embodiments, the intermediary device 502 and the load balancer use the token to connect to a server of the server farm and to perform load balancing, respectively. The token may be obtained from a "load balance info" field of a RDP file, and may be updated into the routing token field of a X.224 Connection Request PDU. The load balancer may use the token to perform load-balancing of client connections to the server farm, in the presence of a session directory/broker for instance.

The RDP request may include other data besides the token. In some embodiments, the RDP request may include: an indication of the target server 106a-n hosting the requested resource (e.g., a reference address of the server 106a-n). In some embodiments, the RDP request may include configuration information to perform a single sign-on (SSO) with the server 106a-n hosting the resource (e.g., a single account identifier, a password, and/or other authentication factors for one or more resources). In some embodiments, the RDP request may include account credentials for the resource (e.g., a username, a password, and/or other authentication factors for the resource). In some embodiments, the RDP request may include configuration information for controlling access to the requested resources hosted on the server 106a-n. The configuration information for controlling access may specify which features of the request resources are available or unavailable to the client 102a-n. The configuration information may correspond to the one or more parameters included in the address of the link used to generate the RDP request. In some embodiments, any of the foregoing may be referred to as part of the configuration information. The client 102a-n may transmit the received RDP request to the intermediary device 502.

In some embodiments, the client 102a-n may determine whether SSO is available at the intermediary device 502. The determination of whether SSO is available may be prior to or subsequent to the sending of the RDP request. If the client 102a-n determines that SSO is available at the intermediary device 502, the client 102a-n may include the configuration information to perform SSO with the server 106*a-n* hosting the requested resource in the RDP request, along with other data. In some embodiments, the client 102*a-n* may send the configuration information to perform the SSO, subsequent to sending the RDP request. On the other hand, if the client 102*a-n* determines that SSO is unavailable at the intermediary device 502, the client 102*a-n* may include account credentials in the RDP request. In some embodiments, the client 102*a-n* may send the account credentials, subsequent to sending the RDP request.

Subsequently, the token verifier 506 of the intermediary device 502 may receive the RDP request from one or more of the clients 102*a-n* to connect to one of the servers 106*a-n* of the server farm 38. In some embodiments, the token verifier 506 may intercept the RDP request from the client 102*a-n*. As the link provided to the one or more clients and used to generate the RDP request may reference the intermediary device 502, all RDP requests from the one or more clients 102*a-n* may land on the intermediary device 502. In the context of the system 500, as the RDP requests may reference the intermediary device 502, the intermediary device 502 may act as a single point of entry from the client 102*a-n* to the servers 106*a-n* of the server farm 38.

To verify the token, the token verifier 506 may parse the RDP request to identify the token included therein. In some embodiments, the token verifier 506 may identify a field of the RDP request corresponding to the token. From the token, the token verifier 506 may identify the destination reference of the RDP request (e.g., Internet Protocol (IP) address or Media Access Control (MAC) address). The token verifier 506 may identify a reference of the load balancer 516. To verify the token of the RDP request, the token verifier 506 may compare the destination reference of the RDP request with the reference of the load balancer 516. If the destination reference of the RDP request does not match the reference of the load balancer 516, the token verifier 516 may send a failure indicator to the client 102*a-n*. In some embodiments, the client 102*a-n* in turn may display a prompt indicating failure to establish an RDP session upon receipt of the failure indicator.

If the destination reference of the RDP request matches the reference of the load balancer 516, the token verifier 506 may determine that the RDP request and/or token is verified or valid. Upon verification of the token, the token verifier 506 may establish an RDP communication stream between the intermediary device 502 and the client 102*a-n*. The RDP communication stream may be used by the intermediary device 502 to send rendering information of the resource from the server 106*a-n*. The RDP communication stream may be used by the client 102*a-n* to send input/output data. In some embodiments, to facilitate data exchange via the RDP stream, the token verifier 506 may establish a Secure Sockets Layer (SSL) session between the client 102*a-n* and the intermediary device 502 to encrypt data transferred between the client 102*a-n* and the intermediary device 502. In some embodiments, the token verifier 506 may perform a SSL handshake process with the client 102*a-n* to establish the SSL session.

In some embodiments, in establishing the RDP communication stream, the token verifier 506 may identify whether SSO is available or unavailable in connecting with the client 102*a-n*. If SSO is available, the token verifier 506 may perform SSO with the client 102*a-n* using the configuration information for performing SSO included in the RDP request. In some embodiments, the token verifier 506 may parse the RDP request to retrieve the configuration information. On the other hand, if SSO is unavailable, the token verifier 506 may modify the server redirect packet such that the client 102*a-n* may send account/user credentials for authentication via the RDP communication stream. For instance, if SSO is unavailable, the token verifier 506 may modify the server redirect packet to send an indication of unavailability of SSO to the client 102*a-n*. Responsive to receipt of the modified server redirect packet (e.g., the indication of unavailability), the client 102*a-n* may send or pass account/user credentials for authentication via the RDP communication stream to the token verifier 506 and/or the target server.

In some embodiments, with the establishment of the RDP communication stream between the intermediary device 502 and the client 102*a-n*, the protocol enforcer 508 may enforce the configuration information for controlling access to the requested resources hosted on the server 106*a-n* included in the RDP request. The protocol enforcer 508 may perform such security enforcement as a smart access control feature, where the intermediary device may allow or block (e.g., control access to) some connection parameters, connection capabilities, or resources, based on configuration. Examples of such connection parameters, connection capabilities, and/or associated resources may include redirection of clipboard resource/data, redirection of printers, redirection of disk drives, redirection of COM ports, redirection of plug-and-play (PnP) devices. The configuration information for controlling access may specify which capabilities or rendering information is permitted to be sent to the client 102*a-n*. The configuration information may also specify which input/output data is permitted to be sent to the server 106*a-n* hosting the resource. In some embodiments, the protocol enforcer 508 may parse the RDP request to identify the configuration information for controlling access. Upon identification of the configuration information, the protocol enforcer 508 may scan the RDP communication stream to identify rendering information from the server 106*a-n* and input/output data from the client 102*a-n*. The protocol enforcer 508 may compare the rendering information and the input/output data with those permitted by the configuration information. If the configuration information specifies that the rendering information and the input/output data is to be restricted, the protocol enforcer 508 may restrict the rendering information to be sent to the client 102*a-n* and the input/output data to be sent to the server 106*a-n*. On the other hand, if the configuration information specifies that the rendering information and the input/output data is to be permitted, the protocol enforcer 508 may allow the rendering information to be sent to the client 102*a-n* and the input/output data to be sent to the server 106*a-n*.

In some embodiments, the protocol enforcer 508 may determine whether to update the configuration information for controlling access to the requested resources hosted on the server 106*a-n* included in the RDP request. To determine whether to update, the protocol enforcer 508 may access a database for the requested resource. The database may include versions of configuration information for the requested resource. The protocol enforcer 508 may compare a most recent version from the database with the version of the configuration information included in the RDP request. If the two versions differ, the protocol enforcer 508 may request an updated configuration information for controlling access from the database. The protocol enforcer 508 may then replace the configuration information for controlling access with the updated configuration information for controlling access in the RDP request.

With the verification of the RDP request, the token verifier 506 may connect with the load balancer 516 for the client 102*a-n*. In some embodiments, the token verifier 506 may transmit a request to connect with the server 106a-n hosting the requested resource to the load balancer 516. The token verifier 506 may generate request to connect with the load balancer 516 based on the data included in the RDP request from the client 102a-n. In some embodiments, the request to connect to the load balancer 516 may include an indication of the target server 106a-n hosting the requested resource, the configuration information to perform a single sign-on (SSO) with the server 106a-n hosting the resource, the account credentials for the resource, and/or the configuration information for controlling access to the requested resources hosted on the server 106a-n.

Upon transmission of the request to connect, the token verifier 506 may establish an RDP communication stream between the intermediary device 502 and the load balancer 516. The RDP communication stream may be used by the intermediary device 502 to send rendering information of the resource from the server 106a-n via the load balancer 516. The RDP communication stream may be used by the intermediary device 502 to forward input/output data from the client 102a-n to the load balancer 516. In some embodiments, to facilitate data exchange via the RDP stream, the token verifier 506 may establish a Secure Sockets Layer (SSL) session between the intermediary device 502 and the load balancer 516 to encrypt data transferred between the intermediary device 502 and the load balancer 516. In some embodiments, the token verifier 506 may perform (or be involved in) a SSL handshake process with the load balancer 516 to establish the SSL session.

In some embodiments, in establishing the RDP communication stream, the token verifier 506 may identify whether SSO is available or unavailable with the load balancer 516 in connecting with the load balancer 516. If SSO is available, the token verifier 506 may perform SSO with the load balancer 516 on behalf of the client 102a-n using the configuration information for the SSO. In some embodiments, the token verifier 506 may parse the RDP request to retrieve the configuration information. If SSO is not available, the token verifier 506 may perform authentication with the load balancer 516 (and/or the authentication server) using the authentication credentials of the RDP request from the client 102a-n. In some embodiments, the token verifier 506 may transmit or forward the RDP request to the load balancer 516. In some embodiments, the RDP request may be transmitted or forwarded with a request to connect to the load balancer 516.

With receipt of the RDP request, the load balancer 516 may select one of the servers 106a-n of the server farm 38 to forward the RDP request. In selecting the server 106a-n, the load balancer 516 may perform load balancing across the servers 106a-n of the server farm 38 to evenly or optimally distribute communications. In some embodiments, the load balancer 516 may identify a consumption of computing resources for each server 106a-n of the server farm 38, such as processing time, available memory, network bandwidth, and/or number of assigned RDP communication streams (sometimes referred to as remote desktop sessions), among others. Based on the consumption of computing resources across the server farm 38, the load balancer 516 may identify one of the servers 106a-n to which to send the RDP request. In some embodiments, the load balancer 516 may compare the consumption of computing resources of each server 106a-n with one another. In some embodiments, the load balancer 516 may rank the servers 106a-n of the server farm 36 by the consumption of computing resources and may select the server 106a-n (referred hereinafter as the initial server 106a) with the lowest (relative) consumption of computing resources, or with the highest relative availability to host the requested RDP session.

Upon selecting the initial server 106a to which to send the RDP request, the load balancer 516 may send or forward the RDP request to the server 106a. The load balancer 516 may parse the RDP request to identify the cookie included in the token. As previously discussed, in some embodiments, the cookie of the token may include the reference address of the target server 106a-n. The initial server 106a identified by the load balancer 516 may differ from the server 106a-n referenced by the cookie of the token included in the RDP request. The load balancer 516 may identify a reference address of the selected server 106a with the reference address of the target server 106a-n specified by the token. If the reference address of the selected server 106a matches the reference address of the target server 106a-n specified by the token, the selected server (or session broker/directory, and/or load balancer 516) may maintain or process the RDP request. In some embodiments, the load balancer and/or intermediary device modifies or removes the token of the RDP request. The load balancer and/or intermediary device may modify or remove the token of the RDP request when the directory service/broker is present. In some embodiments, if the reference address of the selected server 106a-n differs from the reference address of the target server 106a specified by the token, the load balancer 516 may modify or remove the token of the RDP request. If the token is of a format or form that is incompatible with the initial server 106a and/or the session directory/broker (and/or can potentially cause incorrect operation of the initial server 106a and/or the session directory/broker), the load balancer and/or intermediary device may modify or remove the token of the RDP request. In some embodiments, the load balancer 516 may modify the cookie or the destination reference of the token in the RDP request to include the reference address of the selected server 106a.

The load balancer 516 may send a request to connect with the selected server 106a with the RDP request. The load balancer 516 may generate the request to connect with the initial server 106a based on the data included in the RDP request from the client 102a-n and/or the request to connect from the token verifier 506. In some embodiments, the request to connect to the initial server 106a may include the indication of the target server 106a-n hosting the requested resource, an indication of the selected server 106a, the configuration information to perform the single sign-on (SSO) with the server 106a-n hosting the resource, the account credentials for the resource for the client 102a-n, and/or the configuration information for controlling access to the requested resources hosted on the server 106a-n.

Upon transmission of the request to connect, the load balancer 516 may establish an RDP communication session/stream between the load balancer 516 and the initial server 106a. The RDP communication stream may be used by the initial server 106a to send rendering information of the resource to the client 102a-n via the intermediary device 502. The RDP communication stream may be used by the load balancer 516 to forward input/output data from the client 102a-n via the intermediary device 502. In some embodiments, to facilitate data exchange via the RDP stream, the load balancer 516 may establish a Secure Sockets Layer (SSL) session between the load balancer 516 and the initial server 106a to encrypt data transferred between load balancer 516 and the initial server 106a. In some embodiments, the load balancer 516 may perform a SSL handshake process with the initial server 106a to establish the SSL session for the RDP communication stream.

In some embodiments, in establishing the RDP communication stream, the load balancer 516 may identify whether SSO is available or unavailable with the initial server 106a in connecting with the load balancer 516. If SSO is available, the load balancer 516 may perform SSO with the initial server 106a on behalf of the client 102a-n using the configuration information for the SSO. In some embodiments, the load balancer 516 may parse the RDP request to retrieve the configuration information. If SSO is not available, the load balancer 516 may perform authentication with the initial server 106a (and/or authentication server) using the authentication credentials of the RDP request from the client 102a-n. In some embodiments, the load balancer 516 may transmit or forward the RDP request to the initial server 106a. In some embodiments, the RDP request may be transmitted or forwarded with a request to connect to the initial server 106a.

Upon receiving the RDP request from the load balancer 516, the initial server 106a may verify the RDP communication stream with the session directory 518 (sometimes referred to as a directory service, session broker or RDP session broker). To verify the RDP communication stream, the initial server 106a may forward the RDP request to the session directory 518. Using the RDP request, the session directory 518 may determine whether the RDP communication stream is to be assigned to the initial server 106a or redirected to another server servers 106b-n (referred herein as a target server 106b).

In some embodiments, the session directory 518 may determine whether another RDP communication session exists for the client 102a-n. The session directory 518 may include a database to keep track of each pre-existing communication session, the assigned client 102a-n for the corresponding communication session, and/or the assigned server 102a-n for the corresponding communication session. The session directory 518 may access the database to identify which server 106a-n the communication session for the client 102a-n is assigned to. The session directory 518 may compare the server 106a-n indicated in the database for the communication session associated with the client 102a-n, with the initial server 106a to which the load balancer 516 sent the RDP request. If the server 106a-n indicated in the database and the initial server 106a are the same indicating that the pre-existing session is assigned to the initial server 106a, the session directory 518 may maintain the communication session at the initial server 106a for the client 102a-n. On the other hand, if another RDP communication session exists for the client 102a-n, the session directory 518 may identify the other servers 106b-n (e.g., the target server 106b) the communication session is assigned to. The session directory 518 may issue a redirect command. The redirect command may specify that the RDP communication streams for the client 102a-n are to be redirected to the target server 106b.

In some embodiments, the session directory 518 may also perform load balancing to distribute RDP communication streams among the servers 106a-n of the server farm 38. The additional load balancing may change the server 106a-n to which the pre-existing communication session with the client 102a-n is assigned. In some embodiments, the session directory 518 may identify levels of consumption of computing resources for each server 106a-n of the server farm 38, such as processing time, available memory, network bandwidth, and/or number of assigned RDP communication streams (sometimes referred to as remote desktop sessions), among others. Based on the consumption of computing resources across the server farm 38, the session directory 518 may identify one of the servers 106a-n to which to send the RDP request. In some embodiments, the session directory 518 may compare the consumption of computing resources of each server 106a-n with one another. In some embodiments, the session directory 518 may rank the servers 106a-n of the server farm 36 by the consumption of computing resources and may select the server 106a-n (referred hereinafter as the initial server 106a) with the lowest consumption of computing resources. If the selected server 106a-n and the initial server 106a are the same, the session directory 518 may maintain the communication session at the initial server 106a for the client 102a-n. On the other hand, if the selected server 106a-n and the initial server 106a differ, the session directory 518 may issue a redirect command to the initial server 106a. The redirect command may specify that the RDP communication stream (s) for the client 102a-n are to be redirected to the target server 106b.

Using the redirect command received from the server directory 518, the initial server 106a initially selected by the load balancer 516 may generate a server redirect packet. The initial server 106a may then send the server redirect packet to the load balancer 516. In some embodiments, the load balancer 516 may forward the server redirect packet to the intermediary device 502. The server redirect packet may specify that the client 102a-n is to send a redirect connection request to the target server 106b. The server redirect packet may be in conformance with X.224 Connection Request Protocol Data Unit (PDU). The server redirect packet may include a token (sometimes referred to as a routing token). The token may be a byte sequence that may include a length, a length indicator, a type credit, a destination reference (e.g., corresponding to the client, the load balancer 516 or the intermediary device 502), a source reference (corresponding to the initial server 106a), and a cookie, among others. In some embodiments, the cookie may include a reference address corresponding to the target server 106b with which the communication session is to connect. The token of the server redirect packet may differ from the token of the RDP request, at least in part (e.g., the destination reference, source reference, configuration information and/or cookie). In some embodiments, the server redirect packet may include information about the target server 106b, such as a reference address or an identification (e.g., IP address or MAC address) of the target server 106b. In some embodiments, the server redirect packet may include load balancing information (e.g., consumption of computing resources at each server 106a-n).

In some embodiments, the server redirect packet may include data included in the RDP request from the client 102a-n. In some embodiments, the server redirect packet may include the configuration information to perform a single sign-on (SSO) with the server 106a-n hosting the resource (e.g., a single account identifier, a password, and/or other authentication factors for one or more resources). In some embodiments, the server redirect packet may include the account credentials for the resource (e.g., a username, a password, and/or other authentication factors for the resource). In some embodiments, the server redirect packet may include the configuration information for controlling access to the requested resources hosted on the server 106a-n. In some embodiments, the configuration information for controlling access to the requested resources may be from the RDP request.

Subsequently, the redirection handler 510 of the intermediary device 502 may receive the server redirect packet from the load balancer 516. As previously discussed, the token of the RDP request used by the intermediary device 502 and the load balancer 516 may differ from the token of the server redirect packet issued by the session directory 518, e.g., in format and/or content. For example, the reference addresses (e.g., those of the servers 106a-n on the server farm 38) used by the session directory 518 may differ from the reference addresses used by the client, the intermediary device 502 and/or the load balancer 516. Without any adjustment of the server redirect packet, when the server redirect packet reaches the client 102a-n, the client 102a-n may attempt to connect with a server 106c-n different from the target server 106b specified by the session directory 518.

To account for the differences, the redirection handler 510 may modify the server redirect packet to cause the client 102a-n to send a redirected connection request packet to the target server 106b. In some embodiments, the redirection handler 510 may parse the server redirect packet to identify the token included therein. In some embodiments, the redirection handler 510 may parse the token of the server redirect request to identify the destination reference and/or the cookie. Once identified, the redirection handler 510 may replace the reference addresses used by the session directory 518 with reference addresses used by the load balancer 516 and/or the intermediary device 502. In some embodiments, the redirection handler 510 may set the destination reference of the server redirect packet to the reference address of the intermediary device 502 or to the reference address of the load balancer 516, each of which may be used by the intermediary device 502 and the load balancer 516. In some embodiments, the redirection handler 510 may set the cookie of the server redirect packet to the reference address of the target server 106b used by the client, the intermediary device 502 and/or the load balancer 516. Once modified, the redirection handler 510 may send the modified server redirect packet to the client 102 a-n. In this manner, once the client 102a-n receives the server redirect packet, the client 102a-n may be directed to the target server 106b as specified by the session directory 516.

In some embodiments, the redirection handler 510 may detect a presence of the session directory 518. The detection of the presence may be performed prior to the modification of the server redirect packet. The detection of the presence of the session directory 518 may be used to handle subsequent RDP requests, for example. For instance, the redirection handler 510 may parse the server redirect packet to identify the token included therein. The redirection handler 510 may compare the token or other information of the server redirect packet from the initial server 106a with that of the RDP request received previously from the client 102a-n. In some embodiments, the redirection handler 510 may compare the cookie of the server redirect packet with the cookie of the RDP request. A difference in the contents of the token (or other information) between the server redirect packet and the RDP request may indicate the presence of the session directory 518, e.g., because the session directory 518 may use reference addresses different from those used by the load balancer 516 and the intermediary device 502. If certain information of the server redirect packet differs from that of the RDP request, the redirection handler 510 may determine the presence of the session directory 518 in the server farm 38. In some embodiments, the redirection handler 510 may modify the server redirect packet as described above, upon detecting the presence of the session director 518. Otherwise, if the tokens or certain information are the same, the redirection handler 510 may determine that the session directory 518 does not exist in the server farm 38. The redirection handler 510 may then forward the server redirect packet to the client 102a-n without any modification.

In some embodiments, the functionalities of the redirection handler 510 detailed herein may be performed by the load balancer 516. The load balancer 516 may detect the presence of the session directory 518 as described above, similar as the redirection handler 510. In addition, the load balancer 516 may modify the server redirect packet received from the initial server 106a in the manner detailed above as the redirection handler 516. In some embodiments, the load balancer 516 may receive a command to modify the server redirect packet from the redirection handler 510. Receipt of the command to modify may cause the load balancer 516 to modify the server redirect packet as described previously in connection with the redirection handler 510. In some embodiments, the load balancer 516 may forward the server redirect packet to the redirection handler 510, subsequent to the modification of the server direct packet. The redirection handler 510 in turn may forward the modified server redirect packet to the client 102a-n.

Using the modified server redirect packet received from the intermediary device 502, the client 102a-n may generate a redirected connection request packet for connecting with the target server 102b, for performing SSO, and/or for security enforcement. The redirected connection request may be in conformance with X.224 Connection Request Protocol Data Unit (PDU). The redirected connection request may include a token (sometimes referred to as a routing token). The token may be a byte sequence that may include a length, a length indicator, a type credit, a destination reference, a source reference (corresponding to the client 102a-n), and/or a cookie, among others. In some embodiments, the destination reference may correspond to the intermediary device 502 to which the redirected connection request is to be sent. In some embodiments, the destination reference may correspond to the load balancer 516 the redirected connection request is to be sent to. The cookie may include a reference address corresponding to the target server 106b the redirected connection request is to be routed to, via the intermediary device 502 or the load balancer 516.

The redirected connection request may include other data besides the token. In some embodiments, the redirected connection request may include: an indication of the target server 106b (e.g., an identification or a reference address of the target server 106b used by the load balancer 516 and/or the intermediary device 502). In some embodiments, the redirected connection request may include configuration information to perform a single sign-on (SSO) with the target server 105b (e.g., a single account identifier, a password, and/or other authentication factors for one or more resources). In some embodiments, the redirected connection request may include account credentials for the resource (e.g., a username, a password, and/or other authentication factors for the resource). In some embodiments, the redirected connection request may include configuration information for controlling access to the requested resources hosted on the server 106b. The configuration information for controlling access may specify which features of requested resources are available or unavailable to the client 102a-n. The configuration information may correspond to one or more parameters included in the address of the link used to generate the redirected connection request.

In some embodiments, the client 102a-n may then transmit the redirected connection request to the intermediary device 502. The server selector 512 may receive the redirected connection request. Upon transmission of the redirected connection request, the client 102a-n may establish a RDP communication stream between the client 102a-n and the intermediary device 502. The RDP communication stream may be used by the intermediary device 502 to send rendering information of the resource from the target server 106b. The RDP communication stream may be used by the client 102a-n to send input/output data to the target server 106b. In some embodiments, to facilitate data exchange via the RDP stream, the client 102a-n may establish a Secure Sockets Layer (SSL) session between the client 102a-n and the intermediary device 502 to encrypt data transferred between the client 102a-n and the intermediary device 502. In some embodiments, the client 102a-n may perform a SSL handshake process with the intermediary device 502 to establish the SSL session.

In some embodiments, in establishing the RDP communication stream in connection to the redirected connection request, the server selector 512 may identify whether SSO is available or unavailable in connecting with the client 102a-n. If SSO is available, the server selector 512 may perform SSO with the client 102a-n using configuration information for performing SSO included in the redirected connection request. In some embodiments, the server selector 512 may parse the redirected connection request to retrieve the configuration information. On the other hand, if SSO is unavailable, the server selector 512 may send an indication of unavailability of SSO to the client 102a-n. Responsive to receipt of the indication of unavailability, the client 102a-n may send account or user credentials for the requested resource via the RDP communication stream to the server selector 512.

In some embodiments, with the establishment of the RDP communication stream between the intermediary device 502 and the client 102a-n using the redirected connection request, the protocol enforcer 508 may enforce the configuration information for controlling access to requested resources hosted on or potentially transferable from the server 106b (e.g., redirection of data from clipboard to the client). The configuration information for controlling access may specify which capabilities and/or rendering information is permitted to be sent to the client 102a-n. The configuration information may also specify which input/output data is permitted to be redirected between the server 106b and the client. In some embodiments, the protocol enforcer 508 may parse the redirected connection request to identify the configuration information for controlling access. Upon identification of the configuration information, the protocol enforcer 508 may scan the RDP communication stream to identify rendering information from the server 106b and input/output data from the client 102a-n. The protocol enforcer 508 may compare the rendering information and the input/output data with those permitted by the configuration information. If the configuration information specifies that the rendering information and/or the input/output data is to be restricted, the protocol enforcer 508 may restrict the rendering information to be sent to the client 102a-n and/or the input/output data (e.g., to be sent to the server 106b). On the other hand, if the configuration information specifies that the rendering information and the input/output data is to be permitted, the protocol enforcer 508 may allow the rendering information to be sent to the client 102a-n and the input/output data to be sent.

In some embodiments, the protocol enforcer 508 may determine whether to update the configuration information for controlling access to the requested resources hosted on the server 106a-n included in the RDP request. To determine whether to update, the protocol enforcer 508 may access a database for the requested resource. The database may include versions of configuration information for the requested resource. The protocol enforcer 508 may compare a most recent version from the database with the version of the configuration information included in the RDP request. If the two versions differ, the protocol enforcer 508 may request an updated configuration information for controlling access from the database. The protocol enforcer 508 may then replace the configuration information for controlling access with the updated configuration information for controlling access in the RDP request.

Based on the redirected connection request, the server selector 512 may identify the server 106b in the server farm 38 to which to forward the redirected connection request. In some embodiments, the server selector 512 may parse the redirected connection request to identify the indication of the target server 106b to which to direct the redirected connection request. In some embodiments, the server selector 512 may parse the redirected connection request to identify a token therein. Having parsed the redirected connection request, the server selector 512 may parse the cookie of the token. In some embodiments, the server selector 512 may identify the reference address of the target server 106b from the token (e.g., from the cookie). In some embodiments, server selector 512 may set the destination reference of the redirected connection request to the target server 106b (e.g., according to other information determined in the redirected connection request). Having identified the targeted server 106b, the server selector 512 may send the redirected connection request to the target server 106b, e.g., via the load balancer.

The server selector 512 may send a request to connect with the target server 106b. The server selector 512 may generate the request to connect with the target server 106b based on the data included in the redirected connection request from the client 102a-n. In some embodiments, the request to connect to the target server 106b may include the configuration information to perform the single sign-on (SSO) with the target server 106b, the account credentials for the resource for the client 102a-n, and/or the configuration information for controlling access to the requested resources hosted on the server 106b.

Upon transmission of the request to connect, the server selector 512 may establish an RDP communication stream between the server selector 512 and the target server 106b. The RDP communication stream may be used by the target server 106b to send rendering information of the resource to the client 102a-n via the intermediary device 502. The RDP communication stream may be used by the intermediary device 502 to convey the input/output data between the client 102a-n and the target server 106b. In some embodiments, to facilitate data exchange via the RDP stream, the server selector 512 may establish a Secure Sockets Layer (SSL) session between the intermediary device 502 and the target server 106b to encrypt data transferred between the intermediary device 502 and the target server 106b. In some embodiments, the server selector 512 may perform a SSL handshake process with the target server 106b to establish the SSL session for the RDP communication stream.

In some embodiments, in establishing the RDP communication stream, the server selector 512 may identify whether SSO is available or unavailable with the intermediary device 502 in connecting with the target server 106b. If SSO is available, the server selector 512 may perform SSO with the target server 106b on behalf of the client 102a-n using the configuration information (in the redirected connection request) for the SSO. In some embodiments, the server selector 512 may parse the RDP request to retrieve the configuration information. If SSO is not available, the server selector 512 may perform authentication with the target server 106b using the authentication credentials of the redirected connection request from the client 102a-n. In some embodiments, the server selector 512 may transmit or forward the redirected connection request to the target server 106b. In some embodiments, the redirected connection request may be transmitted or forwarded with a request to connect to the target server 106b.

In some embodiments, the client 102a-n may transmit the redirected connection request directly to the load balancer 516. The functionalities of the server selector 512 detailed herein may be performed by the load balancer 516. The load balancer 516 may identify which server 106b to forward the redirected connection request as described above as the redirection handler 510. The load balancer 516 may establish an RDP communication stream with the target server 106b in the manner described above in connection with the server selector 512. In some embodiments, the load balancer 516 may receive a command or request, to connect the client 102a-n with the target server 106b, from the server selector 512. Receipt of the command may cause the load balancer 516 to establish the RDP communication stream using the redirected connection request.

With the modification of the server redirect packet in this manner, subsequent data sent for the communication session from the client 102a-n via the intermediary device 502 and/or the load balancer 516 may land on the correct, target server 106b determined/assigned by the session directory 518. Furthermore, this process may be repeated upon later changes in assignment to the server 106a-n handling the communication session with the client 102a-n by the session directory 518. The intermediary device 502 and the load balancer 516 may thus maintain persistency of the communication session between the clients 102a-n and the servers 106a-n of the server farm 38.

Figure 5B:
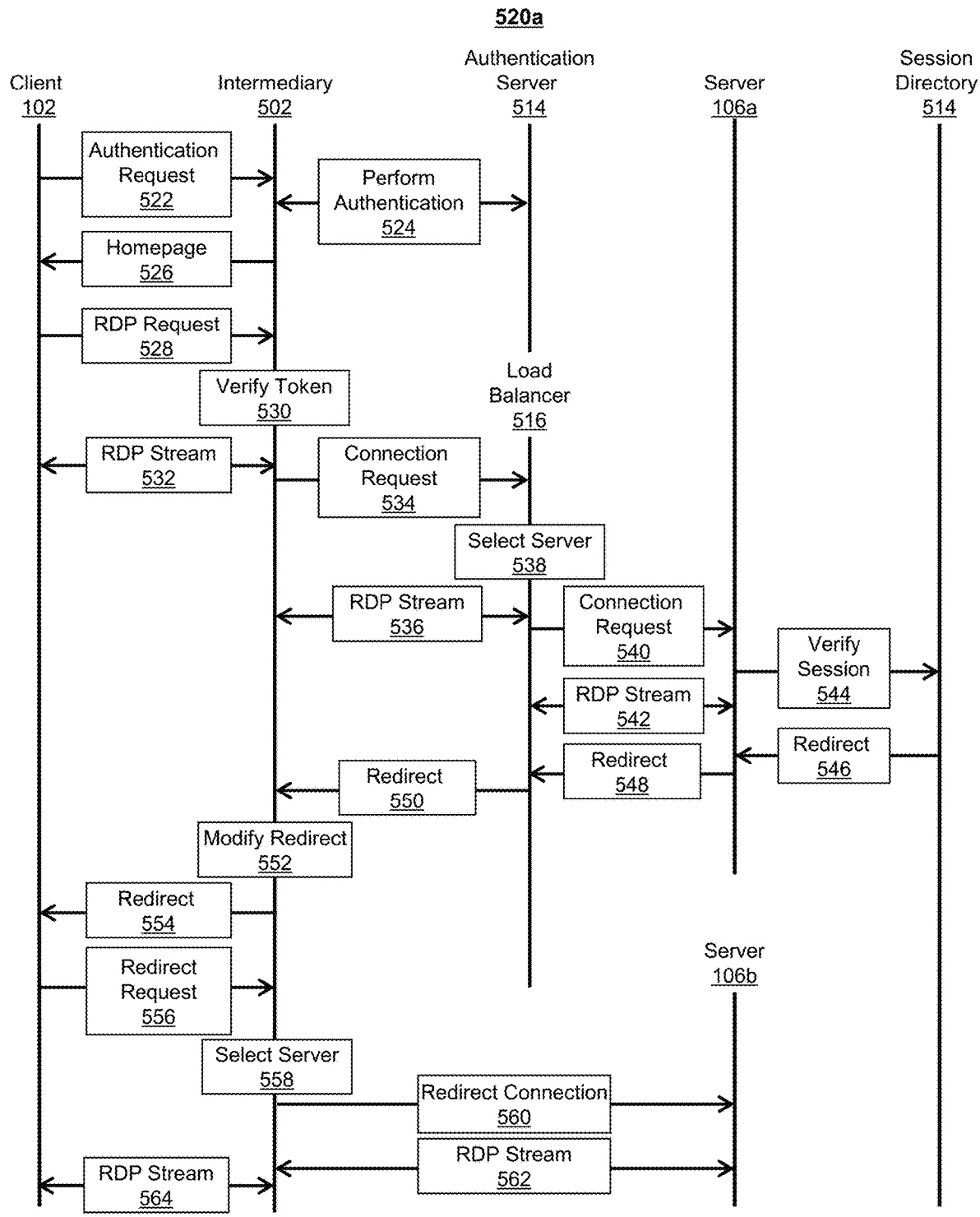
FIGS. 5B and 5C are sequence diagrams of a process of connecting to a server of a plurality of servers in presence of a session broker, in accordance with an illustrative embodiment.

Referring now to FIG. 5B, depicted is a sequence diagram of a process 520a of connecting to a server of a plurality of servers in presence of a session broker. The functionalities of the process 520a may be implemented using the system 500 described above. At step 522, a client may send an authentication request to the intermediary device. At step 502, the intermediary device may perform authentication on behalf of the client with an authentication server. At step 526, once authenticated, the intermediary device may send a homepage with one or more links to resources hosted at the servers. At step 528, the client may send a Remote Desktop Protocol (RDP) request including a token using one of the links included in the homepage. At step 530, the intermediary device may verify the token of the RDP request by determining whether a destination reference is directed to a load balancer, for instance. At step 532, the client and the intermediary device may establish an RDP communication stream.

At step 534, the intermediary device may send a connection request to the load balancer. At step 536, the intermediary device and the load balancer may establish an RDP communication stream. At step 538, using the RDP request received from the intermediary device, the load balancer may select an initial server to which to forward the RDP request, and may remove or modify the token responsive to presence of a session directory/broker. At step 540, the load balancer may send a connection request to the initially selected server (e.g., server 106a). At step 542, the load balancer and the initially selected server may establish an RDP communication stream. At step 544, the initial server may verify the communication session for the client with a session directory. At step 546, the session directory/broker may in turn send a redirect command to the initially selected server. At step 548, based on the received redirect command, the initial server may send a redirect packet to the load balancer. The redirect packet may include token and/or cookies different from those used by the intermediary device and the load balancer. The redirect packet may specify another server (e.g., server 106b) to which to direct subsequent traffic. At step 550, the load balancer in turn may forward the redirect packet to the intermediary device.

At step 552, the intermediary device may modify the redirect packet to set the token and/or cookie, so that the client 102 sends a redirect request that identifies the target server, includes information for SSO and/or includes configuration for security enforcement, and can be used by the intermediary device and/or the load balancer (e.g., to select the backend server, perform SSO). At step 554, the intermediary device may send the modified redirect packet to the client. At step 556, using the modified redirect packet, the intermediary device may send a redirect request to the intermediary device. The redirect request may use the information provided by the intermediary device, as opposed to the session directory. At step 558, the intermediary device may select the target server based on the redirect request. At step 560, the intermediary device may send the redirect connection request to the target server indicated in the redirect request. At step 562, the intermediary device and the target server may establish an RDP communication stream. At step 564, the intermediary device and the client may establish another RDP communication stream.

Figure 5C:
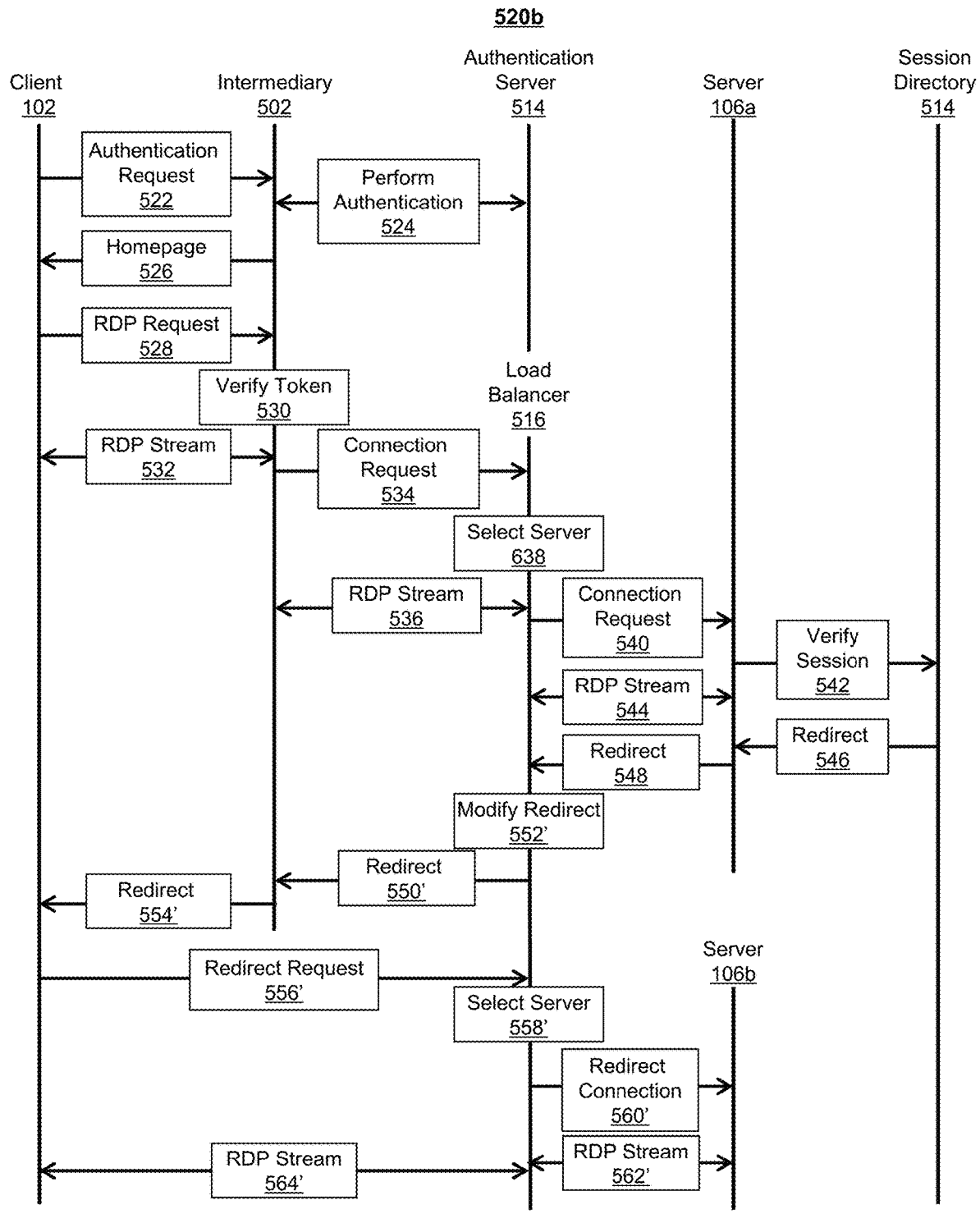

Referring now to FIG. 5C, depicted is a sequence diagram of a process 520b of connecting to a server of a plurality of servers in presence of a session broker. The functionalities of the process 520b may be implemented using the system 500 described above. The process 520b may be similar as process 520a described from steps 522 to 548. Instead of modifying the redirect packet at the intermediary device at step 552 in the process 520a, at step 552' of process 520b, the load balancer may modify the redirect packet to set the token and/or cookie, so that the client 102 sends a redirect request that identifies the target server, includes information for SSO and/or includes configuration for security enforcement, and can be used by the intermediary device and/or the load balancer. At step 550', the load balancer may send the modified redirect packet to the intermediary device. At step 554', the intermediary device may send the modified redirect packet to the client. At step 556', using the modified redirect packet, the intermediary device may send a redirect request to the load balancer. The redirect request may use the information provided by the load balancer, as opposed to the session directory/broker. At step 558', the load balancer may select the target server based on the redirect request. At step 560', the load balancer may send the redirect connection request to the target server indicated in the redirect request. At step 562', the load balancer and the target server may establish an RDP communication stream. At step 564', the load balancer and the client may establish another RDP communication stream.

Figure 5D:
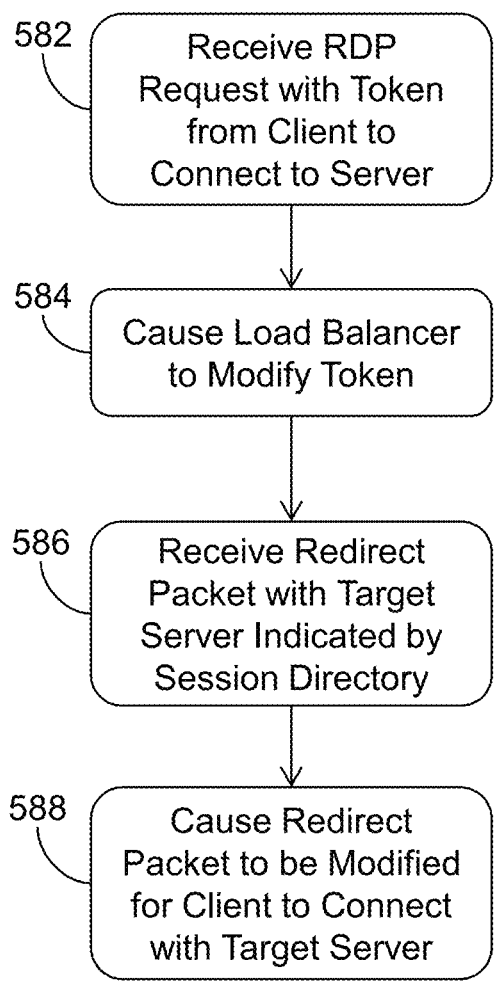
FIG. 5D is a flow diagram of a method of connecting to a server of a plurality of servers in presence of a session broker, in accordance with an illustrative embodiment.

Referring now to FIG. 5D, depicted is a flow diagram of a method 580 of connecting to a server of a plurality of servers in presence of a session broker. The functionalities of the method 580 may be implemented using the system 500 described above. In brief overview, an intermediary device may receive an RDP request from a client to connect to a server (582). The intermediary device may cause a load balancer to modify a token of RDP request (584). The intermediary device may receive a redirect packet with a target server indicated by a session directory (586). The intermediary device may cause the redirect packet to be modified for the client to connect with the target server (588).

Referring to (582), and in some embodiments, an intermediary device may receive an RDP request from a client to connect to a server. The RDP request may be generated and sent by the client upon invocation of a link for accessing a resource hosted on the server. The RDP request may include a token (sometimes referred to as a routing and/or security token). The token may be a byte sequence that may include a length, a length indicator, a type credit, a destination reference (e.g., corresponding to the load balancer), a source reference (e.g., corresponding to the client), and/or a cookie, among others. The token/cookie may indicate a server to which to direct the RDP request, in some embodiments. As specified by the token of the RDP request, the intermediary device may forward the RDP request to the load balancer.

Referring to (584), and in some embodiments, the intermediary device may cause a load balancer to modify or remove a token of RDP request. In some embodiments, the token (if not modified or removed) may be deemed invalid or missing, e.g., by a session directory/broker, and/or a server or RDP host selected by the load balancer. The load balancer may select an initial server to which to send the RDP request to. In some embodiments, the load balancer may determine a consumption of resources across the servers of the server farm and may select one of the servers based on the determined consumption of resources and/or based on the RDP request. The load balancer may set the RDP request to direct the RDP request to the initially selected server. For example, the load balancer may replace the destination reference of the token with the reference address of the initially selected server. Once modified, the load balancer may send the RDP request to the initial server.

Referring to (586), and in some embodiments, the intermediary device may receive a redirect packet with a target server indicated by a session directory/broker. The redirect packet may specify to which server of the server farm communications for the client are to be directed. The session directory/broker may determine that the RDP request is from a user that has established a session (via the client, or another client of the user) with a server different than the initially selected server. The session directory may select a target server besides the server initially identified by the load balancer based on load balancing. The selected target server may correspond to the server that has an existing/prior session established with the user. The session directory may identify that the target server being selected corresponds to a server that is already assigned (or first from the server farm) to handle session connection(s) with the client and/or other client(s) of the same user.

Referring to (588), and in some embodiments, the intermediary device may cause the redirect packet to be modified for the client to connect with the target server. The intermediary device (or the load balancer) may modify the redirect packet such that a redirection connection request subsequently generated by the client may be directed to the target server. The intermediary device and/or the load balancer may modify the server redirect packet in a manner that a redirect connection request from the client can include a security token suitable for directly selecting/identifying the target server for establishing a RDP session connection, performing SSO (e.g., based on configuration information in the redirect connection request or at the intermediary device or load balancer), and/or perform security enforcement. For instance, the intermediary device may change addresses (e.g., target information) included in the redirect packet, e.g., from those used by the session directory to those that can be used by the intermediary device or the load balancer to be directed to the target server. Information in the server redirect packet, such as information related to load-balancing, and/or user credential information, can be modified and/or removed. In some embodiments, the server redirect packet may be modified (e.g., via inclusion of specific triggering markers or configuration information, for the client) to cause the client to generate a corresponding redirect connection request that includes the security token, configuration information and/or information to perform security enforcement. In certain embodiments, the server redirect packet may be modified to cause the corresponding redirect connection request to trigger (e.g., via inclusion of specific triggering markers or configuration information) the intermediary device and/or the load balancer to incorporate the security token, configuration information and/or information to perform security enforcement, into the redirect connection request. For example, upon the intermediary device receiving the redirected connection request packet from the client, the intermediary device may fetch or retrieve a security token to connect to the target server, and/or fetch SSO and/or security enforcement information according to configuration. In some embodiments, the server redirect packet may be modified to cause the corresponding redirect connection request to be sent directly from the client to the load balancer, or to be sent via the intermediary device to the load balancer unaltered.

In some embodiments, when a user initiates a RDP session connection request to the server farm for the first time (from a first client of the user), the connection request may potentially be directed by the load balancer to any server in the server farm. In such a case, the (first) server that receives the connection request may establish a first session with the user, and may not send any server redirect packet. The user may initiate a subsequent (or second) RDP session connection request from the first client or a different client. In such a case, the load balancer may direct the second connection request to a different (e.g., second) server. Because the second connection request landed on the different server, that different server can send a server redirect packet to help the user connect to the same (or first) server where the first session already exists. For the case where the user initiates connection from a different (or second) client (and the connection request lands on a different (or second) server from that for the first client of the user), a redirect packet is sent as the session for the user already exists on the first server. If a different/new user (that does not have any existing or prior established session with the server farm) initiates a subsequent session connection request from a second client, then no redirect packet shall be generated as there are no existing or prior established session for the different/new user.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A system for connecting to a server of a plurality of servers, the system comprising:
a device intermediary between at least one client and a plurality of servers, the device comprising memory and at least one processor configured to:
receive a remote desktop protocol (RDP) request from a first client of the at least one client to connect to one of the plurality of servers, the RDP request including a token;
cause a load-balancer of the plurality of servers to modify or remove the token of the RDP request, responsive to presence of a session directory;
receive a server redirect packet generated by a first server of the plurality of servers that is selected by the load-balancer responsive to the RDP request, the server redirect packet indicating a target server identified from the plurality of servers by the session directory, to which the first client is to connect; and
cause the server redirect packet to be modified to cause the first client to send a redirected connection request packet for connecting with the target server.

2. The system of claim 1, wherein the at least one processor is configured to cause the server redirect packet to be modified to cause the first client to send a redirected connection request packet that includes a token that provides at least one of: an indication of the target server, or configuration information for the device to perform single sign-on (SSO) with the target server, or configuration information for the device to control access to one or more resources.

3. The system of claim 1, wherein the at least one processor is configured to cause the server redirect packet to be modified to cause the first client to provide at least one of: authentication credentials in a RDP communication stream to the target server responsive to unavailability of single sign-on (SSO), or configuration information to control access to one or more resources.

4. The system of claim 1, wherein the at least one processor is configured to cause at least one of: information about the target server, authentication credentials, or information for load-balancing, of the server redirect packet to be modified.

5. The system of claim 1, further comprising the load-balancer, wherein the load-balancer is configured to reside on the device or be separate from the device.

6. The system of claim 1, wherein the at least one processor is configured to receive the RDP request, the RDP request initiated via a link that is published or dynamically created.

7. The system of claim 6, wherein the at least one processor is further configured to receive a second RDP request from a second client to connect to a server of the plurality of servers, the second RDP request initiated via the link.

8. The system of claim 1, wherein the at least one processor is further configured to send the modified server redirect packet to the first client.

9. The system of claim 1, wherein the at least one processor is further configured to cause the load-balancer to modify or remove the token of the RDP request to enable a connection to the first server to be established.

10. A method for connecting to a server of a plurality of servers, the method comprising:
receiving, by a device intermediary between at least one client and a plurality of servers, a remote desktop protocol (RDP) request from a first client of the at least one client to connect to one of the plurality of servers, the RDP request including a token;
causing a load-balancer of the plurality of servers to modify or remove the token of the RDP request, responsive to presence of a session directory;
receiving, by the device, a server redirect packet generated by a first server of the plurality of servers that is selected by the load-balancer responsive to the RDP request, the server redirect packet indicating a target server identified from the plurality of servers by the session directory, to which the first client is to connect; and
modifying the server redirect packet to cause the first client to send a redirected connection request packet for connecting with the target server.

11. The method of claim 10, wherein modifying the server redirect packet comprises modifying the server redirect packet to cause the first client to send a redirected connection request packet that includes a token that provides at least one of: an indication of the target server, configuration information for the device to perform single sign-on (SSO) with the target server, or configuration information for the device to control access to one or more resources.

12. The method of claim 10, wherein modifying the server redirect packet comprises modifying the server redirect packet to cause the first client to provide authentication credentials in a RDP communication stream to the target server, responsive to unavailability of single sign-on (SSO), or configuration information to control access to one or more resources.

13. The method of claim 10, wherein modifying the server redirect packet comprises modifying at least one of: information about the target server, authentication credentials, or information for load-balancing.

14. The method of claim 10, wherein modifying the server redirect packet comprises having at least one of the device or the load-balancer modify the server redirect packet.

15. The method of claim 10, wherein receiving the RDP request from the first client comprises receiving the RDP request initiated via a link that is published or dynamically created.

16. The method of claim 15, further comprising receiving a second RDP request from a second client to connect to a server of the plurality of servers, the second RDP request initiated via the link.

17. The method of claim 10, further comprising sending, by the device, the modified server redirect packet to the first client.

18. The method of claim 10, wherein causing the load-balancer of the plurality of servers to modify or remove the token of the RDP request comprises modifying or removing the token to enable a connection to the first server to be established.

* * * * *